United States Patent Office 2,813,892
Patented Nov. 19, 1957

2,813,892

CALCIUM SALT OF CONDENSATION PRODUCT OF CITRIC AND GLUCONIC ACIDS

Charles L. Mehltretter, Peoria, Ill., assignor to the United States of America as represented by the Secretary of Agriculture No Drawing. Application December 16, 1955, Serial No. 553,674

6 Claims. (Cl. 260—484)

(Granted under Title 35, U. S. Code (1952), sec. 266)

A non-exclusive, irrevocable, royalty-free license in the invention herein described, for all governmental purposes, throughout the world, with the power to grant sub-licenses for such purposes, is hereby granted to the Government of the United States of America.

This invention relates to and has as its prime object the provision of a novel composition of matter, namely, the calcium salt of a condensation product of citric and gluconic acid (or glucono-delta-lactone). The objects of this invention also include the provision of processes for preparing the novel composition. Other objects and advantages of the invention will be obvious from the following description.

The composition of this invention is prepared by condensing citric acid with an equimolar quantity of gluconic acid or glucono-delta-lactone. The condensation is conveniently performed by heating the reagents at a temperature of about 100° to 150° C. The calcium salt is then formed by neutralizing the free carboxyl group of the condensation product with calcium hydroxide, bicarbonate, or carbonate.

It is believed that the condensation involves the esterification of one carboxyl group of the citric acid with a hydroxyl group of the gluconic acid (or lactone) in accordance with the following equations:

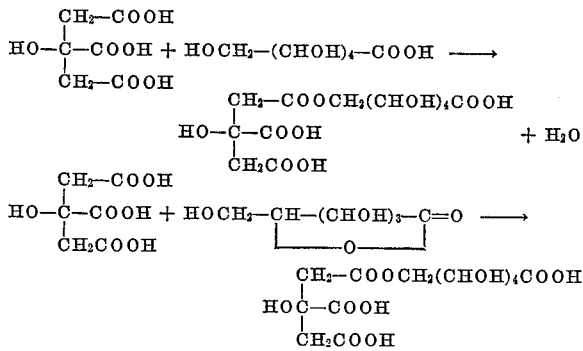

Although it is believed that the condensation involves the reaction as above described, an esterification of the carboxyl group of the gluconic acid with the hydroxyl group of the citric acid is not excluded as a possible mechanism of reaction. From a practical standpoint, the composition of this invention is produced as described herein and the theoretical nature of the mechanism of the condensation reaction is not material to the invention. Regardless of what type of reaction occurs, the novel product is produced and that is the important feature of the procedure.

The composition of this invention is characterized by combining a high calcium content with high water solubility and hence the composition is of value in animal husbandry where large doses of calcium in solution are required in a single injection as, for example, in the treatment of cows for milk fever. In this regard, the present composition exhibits a better combination of calcium content and water solubility as compared with calcium gluconate and calcium lactate, the latter two compounds being accepted calcium salts for veterinary use. The superiority of the present composition over these commonly used calcium salts is shown in the following table:

|  | Composition of this invention | Monohydrate of calcium gluconate | Pentahydrate of calcium lactate |
|---|---|---|---|
| Solubility in water at 25° C., g./100 ml. | 33 | 4 | 5 |
| Calcium content, percent | 12.9 | 8.9 | 13.0 |

The invention is further demonstrated by the following example which is furnished only by way of illustration and not limitation.

*Example*

44.5 grams (0.25 mole) of D-glucono-delta-lactone were mixed with 52.5 grams (0.25 mole) of citric acid monohydrate and heated at 130–140° C. for 4 hours in an open beaker. The melt was cooled and dissolved in 126 ml. of distilled water with the aid of stirring and 38 grams of calcium carbonate introduced in portions with stirring and allowed to react for several hours. A small amount of unreacted calcium carbonate was removed by filtration. The clear filtrate was poured in a thin stream into 400 ml. of vigorously stirred methanol. The white product that precipitated was filtered and suspended in 400 ml. of fresh methanol to remove most of the water from the precipitate. The product was filtered, washed with methanol, and equilibrated to room humidity to remove adhering methanol. It was then dried at 60° C. for 12 hours. A yield of 104 grams of product was obtained which had a calcium content of 12.9% (13.5% dry basis) and moisture content of 6.4%.

A sample of the calcium salt dissolved in water and reprecipitated with methanol, equilibrated and dried showed the following dry basis analysis: calcium 13.3%, carbon 33.3%, hydrogen 3.7%. Theory for calcium citrylgluconate, calcium 14.1%, carbon 33.7%, hydrogen 3.5%.

Having thus described the invention, I claim:

1. The process which comprises heating at a temperature of about from 100 to 150° C. for a period of time sufficient to eliminate about one mole of water per mole of citric acid a mixture consisting of citric acid and an essentially equimolar quantity of a compound selected from the group consisting of gluconic acid and glucono-delta-lactone, discontinuing the heating and neutralizing the product with a calcium compound to obtain a water-soluble calcium salt of said compound.

2. The process which comprises heating at a temperature of about from 100 to 150° C. for a period of time sufficient to eliminate about one mole of water per mole of citric acid a mixture consisting of citric acid and an essentially equimolar quantity of gluconic acid, discontinuing the heating and neutralizing the product with calcium carbonate to obtain a water-soluble calcium salt of said product.

3. The process which comprises heating at a temperature of about from 100 to 150° C. for a period of time sufficient to eliminate about one mole of water per mole of citric acid a mixture consisting of citric acid and an essentially equimolar quantity of glucono-delta-lactone, discontinuing the heating and neutralizing the product with calcium carbonate to obtain a water-soluble calcium salt of said product.

4. The water soluble calcium salt of a product produced by heating at a temperature of about from 100 to 150° C. for a period of time sufficient to eliminate about one mole of water per mole of citric acid a mixture consisting of citric acid and an essentially equimolar quantity of a compound selected from the group consisting of gluconic acid and glucono-delta-lactone and neutralizing the product with a calcium compound.

5. The water soluble calcium salt of a product produced by heating at a temperature of about from 100 to 150° C. for a period of time sufficient to eliminate about one mole of water per mole of citric acid a mixture consisting of citric acid and an essentially equimolar quantity of gluconic acid and neutralizing the product with a calcium compound.

6. The water soluble calcium salt of a product produced by heating at a temperature of about from 100 to 150° C. for a period of time sufficient to eliminate about one mole of water per mole of citric acid a mixture consisting of citric acid and an essentially equimolar quantity of glucono-delta-lactone and neutralizing the product with a calcium compound.

References Cited in the file of this patent

UNITED STATES PATENTS

| 1,983,954 | Taylor | Dec. 11, 1934 |
| 2,118,985 | Schmidt et al. | May 31, 1938 |

FOREIGN PATENTS

| 647,080 | Great Britain | Dec. 6, 1950 |

OTHER REFERENCES

March et al.: J. Am. Pharm. Assoc. 41 (1952), pp. 366–7.